(12) United States Patent
Bull et al.

(10) Patent No.: US 8,930,817 B2
(45) Date of Patent: Jan. 6, 2015

(54) THEME-BASED SLIDESHOWS

(75) Inventors: William Bull, Mountain View, CA (US);
Kourtny Minh Hicks, Sunnyvale, CA (US); Eric James Hope, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1199 days.

(21) Appl. No.: 12/193,517

(22) Filed: Aug. 18, 2008

(65) Prior Publication Data
US 2010/0042926 A1  Feb. 18, 2010

(51) Int. Cl.
G06F 3/00 (2006.01)
G06F 1/16 (2006.01)
G06F 17/30 (2006.01)
G11B 27/034 (2006.01)

(52) U.S. Cl.
CPC ........ G06F 1/1632 (2013.01); G06F 17/30047 (2013.01); G06F 17/30056 (2013.01); G06F 17/30265 (2013.01); G11B 27/034 (2013.01)
USPC ............................. 715/732; 715/730; 715/731

(58) Field of Classification Search
CPC ............... H04L 12/1813; G06T 13/00; G09G 2370/027; G09G 2340/12; G06F 17/212
USPC .................................................. 715/730–732
See application file for complete search history.

(56) References Cited

U.S. PATENT DOCUMENTS

| | | | |
|---|---|---|---|
| 6,323,846 B1 | 11/2001 | Westerman et al. | |
| 6,323,856 B1 | 11/2001 | Smilansky et al. | |
| 7,000,192 B2 * | 2/2006 | Allen et al. | 715/764 |
| 7,840,905 B1 | 11/2010 | Weber et al. | |
| 2007/0061745 A1 * | 3/2007 | Anthony et al. | 715/764 |
| 2008/0005679 A1 * | 1/2008 | Rimas-Ribikauskas et al. | 715/745 |
| 2008/0215984 A1 * | 9/2008 | Manico et al. | 715/730 |
| 2008/0215985 A1 * | 9/2008 | Batchelder et al. | 715/731 |
| 2008/0319844 A1 * | 12/2008 | Hua et al. | 705/14 |
| 2009/0089711 A1 * | 4/2009 | Dunton et al. | 715/838 |
| 2009/0094518 A1 * | 4/2009 | Lawther et al. | 715/716 |
| 2011/0107223 A1 * | 5/2011 | Tilton et al. | 715/730 |

* cited by examiner

Primary Examiner — Omar Abdul-Ali
Assistant Examiner — Sherrod Keaton
(74) Attorney, Agent, or Firm — Morgan, Lewis & Bockius LLP

(57) ABSTRACT

A system and method for providing photographic slideshows with theme elements is provided. Each photograph and each theme element may be associated with different contextual information. The contextual information may include, for example, locations, time and date, calendar events, user preference or history information, or any other suitable information. In response to receiving a selection of contextual information, the electronic device may identify photographs and theme elements associated with contextual information to generate a photographic slideshow. Alternatively, in response to receiving a selection of at least one photograph or theme element, the electronic device may identify contextual information associated with the selected photograph or theme element to identify other photographs and theme elements associated with the identified contextual information for generating a photographic slideshow.

18 Claims, 8 Drawing Sheets

THEME-BASED SLIDESHOWS

BACKGROUND OF THE INVENTION

The present invention relates to the creation and display of photographic slideshows on an electronic device.

Many electronic devices are capable of displaying images, video files, or other types of media. For example, personal computers, portable electronic devices (such as the Apple iPod®, the Apple iPhone®, cellular phones, digital cameras, and other devices), and digital picture frames may be capable of displaying photographs. Many of these electronic devices may be capable of displaying photographs in succession as a slideshow.

Some electronic devices may include additional elements to slideshows. For example, digital movie creation software running on a personal computer may allow a user to place image files in a movie saved as a video file with various effects to create a photographic slideshow. The video file may be played back on other devices and can be exported to, for example, portable electronic devices as video files. However, such software programs may be large and a slideshow created in this manner cannot be changed unless the user edits the movie in digital movie creation or editing software on a personal computer.

Some slideshow creation software operating on a personal computer or over the internet may enable the user to create a slideshow with additional elements. The slideshows created by this software can be viewed over the internet or saved on a personal computer, and can also sometimes be exported to another electronic device. Once the slideshow is created, however, it generally cannot be changed unless a user edits it in slideshow creation software or digital movie editing software.

Some portable electronic devices may add simple effects to the display of a slideshow. For example, some portable electronic devices give users the option to play an audio file while a slideshow plays or to indicate transition elements, such as a bar wipe, in which a bar moves across the screen revealing the next photograph to be displayed.

Although the various approaches described above may be useful, they do not allow electronic devices to create slideshows dynamically, using contextual information, photographs, theme elements, and any other information available to the electronic device.

SUMMARY OF THE INVENTION

Systems, methods and computer-readable media for providing photographic slideshows that include theme elements are provided.

A photographic slideshow may be generated using any suitable approach. In some embodiments, the electronic device may receive contextual information. For example, the electronic device may receive at least one of a location, time, date, a calendar event, a holiday, user preference information, history information, user purchase information, communications information, or any other suitable contextual information. The electronic device may, based on the received contextual information, identify at least one photograph (e.g., stored on or available to the electronic device) that is associated with the received contextual information. For example, the electronic device may identify photographs based on metadata that includes the received contextual information.

The electronic device may also, based on the received contextual information, select at least one theme element or one theme associated with the contextual information. For example, the electronic device may identify theme elements based on metadata that includes the received contextual information. The theme elements may include any element operative to be displayed or provided in addition to the at least one photograph, including for example a stationary element, a moving element, an audio element (e.g., music or audio clips), a transition element, a photograph selection element, or any other suitable element.

The electronic device may then generate a photographic slideshow that includes the identified photographs and theme elements, and provide the generated photographic slideshow for display. In some embodiments, the electronic device may apply the theme or theme elements to other displays of the electronic device, including for example menus (e.g., displays that do not include photographs).

In some embodiments, the electronic device may instead or in addition receive a user selection of one or more of a photograph, a theme element, or a theme (e.g., a grouping of related theme elements). The electronic device may identify contextual information associated with the selected photograph, theme element, or theme and identify additional photographs, theme elements, or themes related to the identified contextual information. The electronic device may then generate and display a photographic slideshow that includes some or all of the identified additional photographs, theme elements, or themes.

BRIEF DESCRIPTION OF THE DRAWINGS

The above and other features of the present invention, its nature, and various advantages will be more apparent upon consideration of the following detailed description, taken in conjunction with the accompanying drawings, in which like reference characters refer to like parts throughout, and in which.

DETAILED DESCRIPTION

Systems and methods are provided for providing displays of photographs with theme elements as photographic slideshows. An electronic device may display one or more photographs to a user. To enhance the user's viewing experience, one or more theme elements may be added to the photograph display. For example, theme elements may include stationary or moving elements (e.g., stationary or moving images or graphics). As another example, theme elements may include elements that affect the display of photographs. Such elements may include, for example, transition elements and photograph selection elements (by which photographs located in a particular portion of the screen are displayed in full, while other photographs may be only partially displayed).

To provide a more consistent experience, the electronic device may select theme elements that share a common attribute or contextual information. For example, the electronic device may select theme elements that are associated with a particular season or weather type (e.g., summer theme elements). As another example, the electronic device may select theme elements that are associated with a particular location (e.g., theme elements associated with a city, state, country or planet). As still another example, the electronic device may select theme elements that are associated with particular events (e.g., a holiday or an event in a user's calendar).

Several theme elements may be combined into themes to apply to an electronic device display. The electronic device may generate themes using any suitable approach. For example, the electronic device may receive theme elements to combine from a user instruction. As another example, the electronic device may receive or download complete themes from remote sources (e.g., the Internet). As still another example, the electronic device may generate themes by selecting theme elements that share particular contextual information or metadata (e.g., combine theme elements associated with New York).

In some embodiments, the electronic device may automatically generate photographic slideshows that include theme elements related to the displayed photographs. For example, the electronic device may receive a selection of contextual information (e.g., automatically select or receive a user selection of contextual information) and identify photographs and theme elements that share or are related to the selected contextual information. As another example, the electronic device may receive a selection of one or more photographs or theme elements. In response to receiving the selection, the electronic device may determine contextual information associated with the selected photographs or theme elements, and identify other photographs or theme elements associated with or related to the determined contextual information to generate a photographic slideshow that includes photographs and theme elements that share contextual information.

Figure 1:
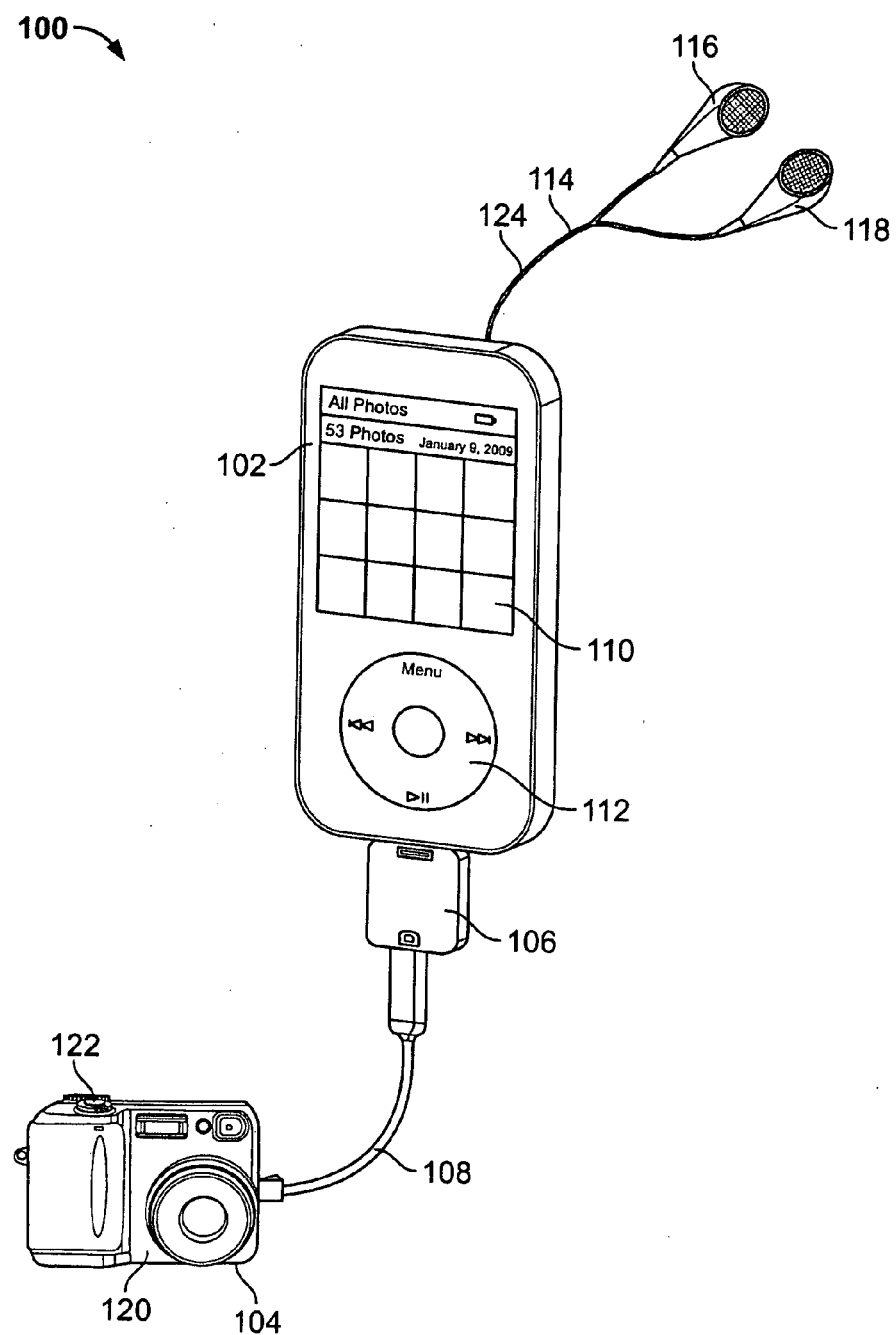
FIG. 1 is a simplified diagram of a computer system in accordance with one embodiment of the invention.

FIG. 1 is a simplified diagram of a computer system in accordance with one embodiment of the invention. In some embodiments, computer system 100 may include handheld device 102, accessory device 104, and audio output 114. Handheld device 102 is shown as including display component 110 and user input component 112.

FIG. 1 shows display component 110 as a display screen that is integrated into handheld device 102. Display component 110, like any other component discussed herein, does not have to be integrated into handheld device 102, however. For example, display component 110 may be a computer monitor, television screen, or any other graphical user interface, textual user interface, or combination thereof. Display component 110 may enable handheld device 102 to display photographs and slideshows of photographs, to playback the video portion of video content, to serve as part of the user interface (for example, by displaying user interface displays), or any combination thereof.

FIG. 1 illustrates user input component 112 as a click wheel. One skilled in the art would appreciate that user input component 112 could be any type of user input device that is integrated into or located external to handheld device 102. For example, user input component 112 could be a mouse, keyboard, trackball, slider bar, one or more buttons, electronic device pad, dial, or any combination thereof. User input component 112 may also include a multi-touch screen such as that shown in FIG. 2 and described in commonly assigned Westerman et al., U.S. Pat. No. 6,323,846, issued Nov. 27, 2001, entitled "Method and Apparatus for Integrating Manual Input," which is incorporated by reference herein in its entirety.

Accessory device 104 can include camera 120 and photograph capture button 122. Camera 120 can receive visual signals using circuitry (not shown) included in handheld device 102, accessory device 104 or both, which can operate to convert the visual signals into one or more photograph or video data files. As used herein, the word "photograph" includes any type of electronic image data file. Image data files can be stored or encoded using any suitable format, including for example tiff, raw, jpg, gif, or any other suitable image format. Video data files can be stored or encoded using any suitable format, including for example mov, mpg, mpeg, avi, mp4, or any other suitable video format. Button 122, user input component 112, and other user interface components (not shown) can be used to interact with (for example, edit, save, export, delete, or any suitable function) the photograph or video data files.

Accessory device 104 is shown in FIG. 1 as physically and electrically coupled to handheld device 102 via a cable 108 and a connector component 106. In some embodiments, accessory device 104 can be wirelessly coupled to handheld device 102. When accessory device 104 is coupled to handheld device 102, one or both devices may have enhanced functionality. This enhanced functionality may automatically occur in response to the devices being coupled together, in response to a user input, or in response to a system event. For example, handheld device 102 may not have its own camera or only have a lower resolution camera, but can direct accessory device 104 to take high resolution photographs when accessory device 104 is coupled to handheld device 102. As another example, specialized circuitry or applications (for example, for recording and converting visual signals) may be included only in accessory device 104 and not in handheld device 102.

Audio output 114 can include earphones 116 and 118. Audio output 114 is shown as being an external device electrically coupled to handheld device 102, but one skilled in the art would appreciate that audio output 114 could also comprise any type of audio output that is integrated into or external to handheld device 102. For example, audio output 114 could also include a speaker or speakers, headphones, or connector. Audio output 114 enables handheld device 102 to produce audio, play back audio content, play back the audio component of video content, play the audio component of photographic slideshows, serve as part of the user interface, produce other relevant audio content, or any combination thereof. Audio output 114 is shown in FIG. 1 as being physically and electrically coupled to handheld device 102 via a cable 124. In other embodiments, audio output 114 can be wirelessly coupled to handheld device 102.

Figure 2:
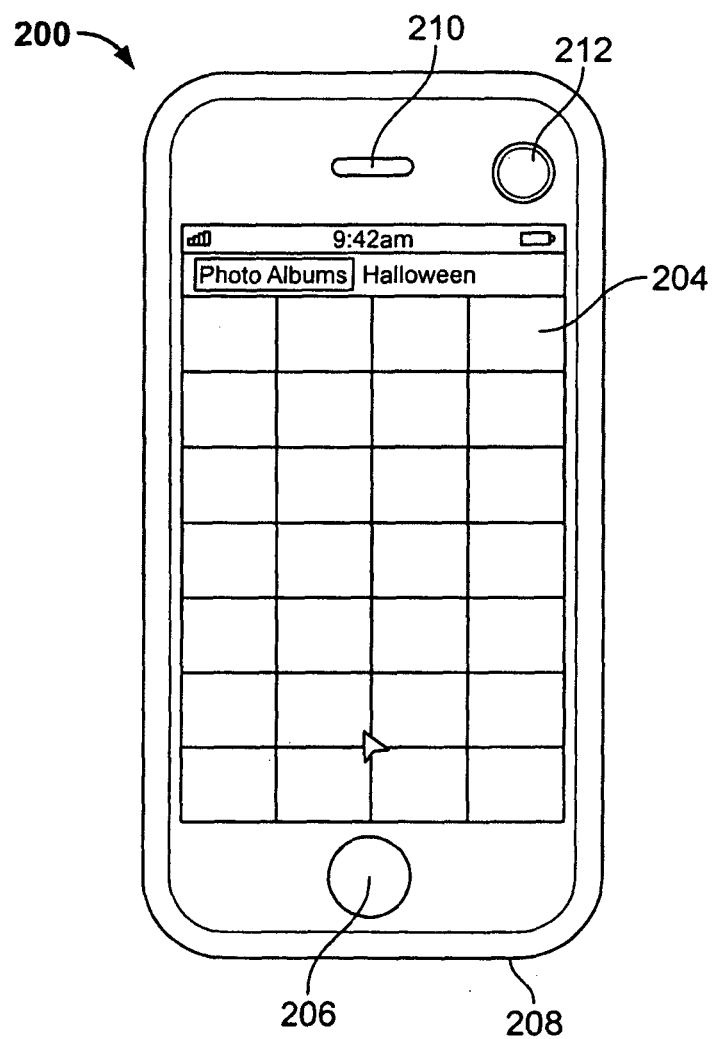
FIG. 2 is an illustrative electronic device for displaying information in accordance with one embodiment of the present invention.

FIG. 2 is an illustrative electronic device for displaying information in accordance with one embodiment of the present invention. Electronic device 200 can include any suitable electronic device, including for example a portable media player, cellular telephone, personal organizer, digital picture frame, hybrid of such devices, or any other electronic device. Electronic device 200 may include user interface component 204. User interface component 204 is shown in FIG. 2 as a multi-touch screen that can function as both an integrated display screen and user input device. Electronic device 200 can also include one or more other user interface components, such as button 206, which can be used to supplement user interface component 204. User interface component 204, like display component 110 discussed above, may enable electronic device 200 to display photographs, slideshows of photographs, or playback the video portion of video content, and may serve as part of the user interface. In addition, user interface component 204, like user input component 112 above, may enable the device to receive interaction from the user.

Microphone 208 and audio output 210 may be respective examples of input and output components that can be integrated into electronic device 202. Audio output 210 may function similarly to or the same as audio output 114 discussed above.

Camera 212 can be an example of an input component that can be integrated into electronic device 202. Camera 212 may function similarly to or the same as camera 120, discussed above. As such, the visual signal capture functionality, circuitry, and components of accessory device 104 of FIG. 1 can be integrated into electronic device 202.

Figure 3:
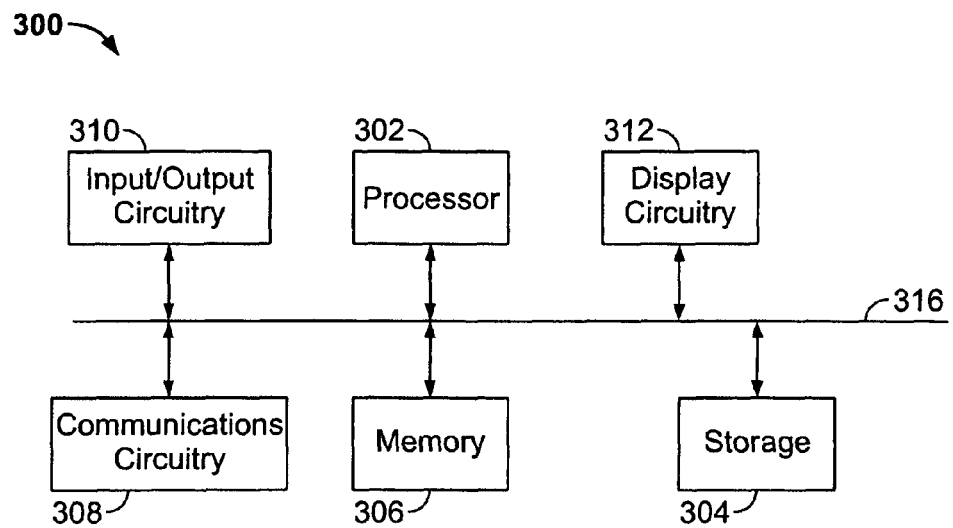
FIG. 3 is a simplified schematic diagram of an illustrative electronic device in accordance with one embodiment of the present invention.

FIG. 3 is a simplified schematic diagram of an illustrative electronic device in accordance with one embodiment of the present invention. Electronic device 300 can include control processor 302, storage 304, memory 306, communications circuitry 308, input/output circuitry 310, display circuitry 312, power supply circuitry 314, or any combination thereof. In some embodiments, electronic device 300 can include more than one of each component or circuitry, but for sake of simplicity, only one of each is shown in FIG. 3. In addition, one skilled in the art would appreciate that the functionality of certain components and circuitry can be combined or omitted and that additional components and circuitry, which are not shown in FIGS. 1-3, can be included in handheld device 102, accessory device 104, electronic devices 200 and 300, or any combination thereof.

Processor 302 can include, for example, circuitry configured to perform any function. Processor 302 may be used to run operating system applications, firmware applications, media playback applications, media editing applications, photograph display applications, any other application, or any combination of applications.

Storage 304 can be, for example, one or more storage media, including for example, a hard-drive, flash memory, permanent memory such as ROM, any other suitable type of storage component, or any combination of storage media. Storage 304 may store, for example, media data (e.g., music, photographs, and video files), metadata (e.g., information about media data), application data (e.g., for implementing functions on device 200), firmware, user preference information data (e.g., media playback preferences), lifestyle information data (e.g., food preferences), exercise information data (e.g., information obtained by exercise monitoring equipment), transaction information data (e.g., information such as credit card information), wireless connection information data (e.g., information that may enable electronic device 300 to establish a wireless connection), subscription information data (e.g., information that keeps track of podcasts or television shows or other media to which a user subscribes), contact information data (e.g., telephone numbers and email addresses), calendar information data, any other suitable data, or any combination thereof.

Memory 306 can include cache memory, semipermanent memory such as RAM, one or more different types of memory used for temporarily storing data, or any combination of memory types. Memory 306 can also be used for storing data used to operate electronic device applications.

Communications circuitry 308 can permit device 300 to communicate with one or more servers or other devices using any suitable communications protocol. For example, communications circuitry 308 may support Wi-Fi (e.g., a 802.11 protocol), Ethernet, Bluetooth™ (trademark owned by Bluetooth Sig, Inc.), radio frequency systems, infrared, TCP/IP (e.g., any of the protocols used in each of the TCP/IP layers), HTTP, BitTorrent, FTP, RTP, RTSP, SSH, any other communications protocol or combination of communications protocols.

Input/output circuitry 310 can convert (and encode/decode, if necessary) analog signals and other signals (for example, physical contact inputs (from for example, a multi-touch screen), physical movements (from, for example, a mouse), analog audio signals, analog visual signals, or any other appropriate signals) into digital data. Input/output circuitry can also convert digital data into any other type of signal or vice-versa. The digital data can be provided to and received from processor 302, storage 304, memory 306, or any other component of electronic device 300. Although input/output circuitry 310 is illustrated in FIG. 3 as a single component of electronic device 300, a plurality of input/output circuitry can be included in electronic device 300. Input/output circuitry 310 can be used to interface with any input or output component, such as those discussed in connection with FIGS. 1 and 2. For example, electronic device 300 can include specialized input circuitry associated with, for example, one or more microphones, cameras, proximity sensors, accelerometers, ambient light detectors, or other appropriate input devices. Electronic device 300 can also include specialized output circuitry associated with output devices such as, for example, one or more speakers, or other appropriate output device.

Display circuitry 312 can accept and generate signals for presenting media information (textual, graphical, or any combination thereof) on a display screen such as those discussed below. For example, display circuitry 312 can include a coder/decoder (CODEC) to convert digital media data into analog signals. Display circuitry 312 also can include display driver circuitry, circuitry for driving display driver(s), or any combination thereof. The display signals can be generated by processor 302 or display circuitry 312. The display signals can provide media information related to media data received from communications circuitry 308, any other component of electronic device 300, or any combination thereof. In some embodiments, display circuitry 312, like any other component discussed herein, can be integrated into or electrically coupled to electronic device 300.

Bus 316 can provide a data transfer path for transferring data to, from, or between control processor 302, storage 304, memory 306, communications circuitry 308, and any other component included in electronic device.

FIGS. 4-12 depict representative interactive user interface displays according to embodiments of the invention. In some embodiments, a processor, other circuitry, or combination thereof can be configured to present the interactive user interface displays of FIGS. 4-12 on a display screen or other user interface component. It is important to note that the displays shown in FIGS. 4-12 may be unique in that they may be optimized to provide advanced interactive functionality, despite the limitations of relatively simple user input devices, such as a click wheel or six button remote control or other limited interface. Designing interactive displays that are used in conjunction with these types of simple user input devices is generally a more complicated process than designing displays that are used with other user input devices (such as a mouse, keyboard, cellular telephone keypad, standard remote control that has more than 6 buttons, etc.). Simple user input devices, though easy for users to use, may limit how a user can navigate within a display and among multiple displays.

Figure 4:
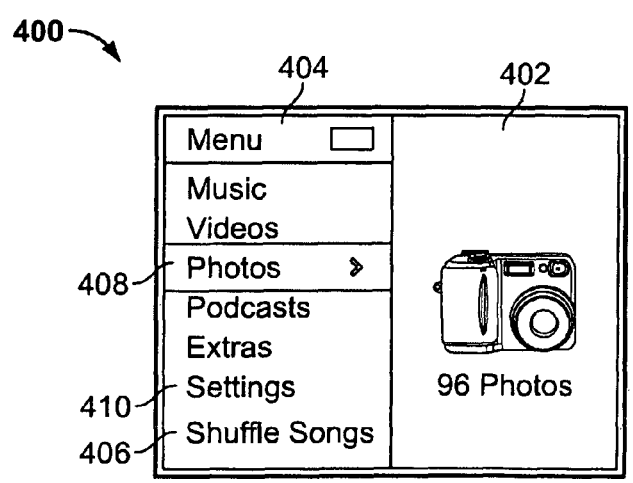
FIG. 4 is a schematic view of an illustrative display for navigating an electronic device in accordance with one embodiment of the invention.

FIG. 4 is a schematic view of an illustrative display for navigating an electronic device in accordance with one embodiment of the invention. Processor 302, display circuitry 312, or a combination thereof may generate display 400. Display component 110, user interface 204, any other suitable display, or a combination thereof can show display 400. Like any display discussed herein, an electronic device can present display 400 in response to, for example, receiving a user selection of an option included on a main menu display (not shown), the user selecting an input button (virtual or physical) dedicated to display 400, the electronic device powering ON, an accessory device (such as, for example, accessory device 104) being coupled to the electronic device, receiving a signal from a remote device (not shown), or any other stimulus or combination of stimuli.

Display 400 can be subdivided into one or more regions, such as for example, information region 402, header region 404, and options region 406. One skilled in the art would appreciate that the displays shown herein are merely illustrative examples and that more or fewer than three regions could be included in any display presented by an electronic device without departing from the spirit of the present invention.

Information region 402 can include, for example, animated icons, static icons, or a combination thereof. Information region 402 can also include any other information, including for example any information derived from or associated with menu options in options region 406.

Header region 404 can include a title or other information that helps the user understand the relative relationship between display 400 and other displays the electronic device provides. FIG. 4 shows header region 404 as simply including a display title, but in other embodiments, header region 404 could also include, for example, a graphical file manager, tree structure back button, delete button, or any other suitable information.

FIG. 4 shows options region 406 as including a vertical list of options that may be selected by a user. One skilled in the art would appreciate that the options could be arranged and grouped in any manner, including for example a vertical list or two-dimensional table. As the user navigates through the list of options, the electronic device can update information region 402 automatically. For example, FIG. 4 shows options region 406 with Photos option 408 highlighted and the electronic device presenting corresponding information (for example, an icon and number of photographs) in information region 402.

Figure 5:
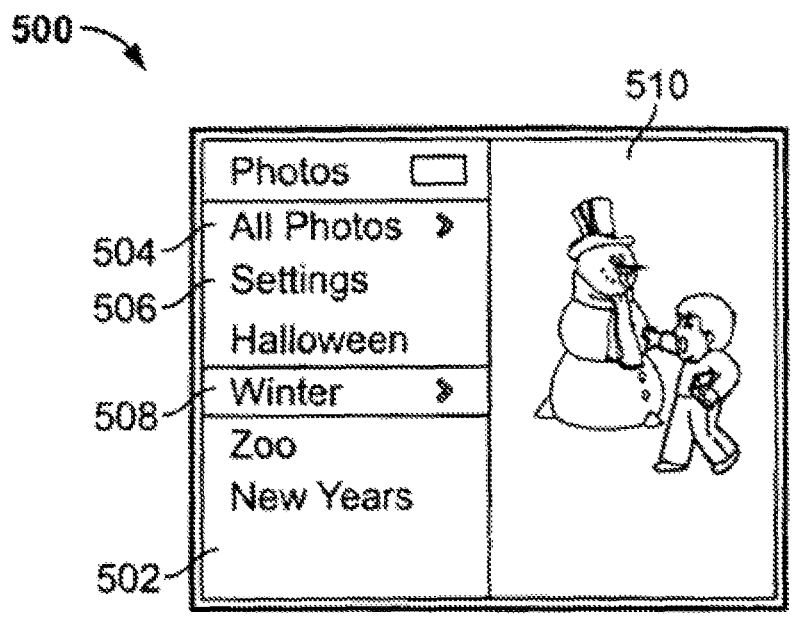
FIG. 5 is a schematic view of an illustrative display for viewing Photos options in accordance with one embodiment of the invention.

FIG. 5 is a schematic view of an illustrative display for viewing Photos options in accordance with one embodiment of the invention. The electronic device may provide display 500 in response to receiving a selection of Photos option 408 (FIG. 4). Display 500 may include several options in options region 502 that are associated with Photos option 408. For example, FIG. 5 shows the electronic device displaying All Photos option 504, Settings option 506, Winter album option 508, a Halloween album option, a Zoo album option, and a New Years album option in region 502. Album options Winter album option 508, Halloween album option, Zoo album option, and New Years album option can each designate a predetermined album or packet of photographs. Options for any suitable number of albums or sub-albums may be displayed in options region 502.

In response to highlighting an option in option region 502, the electronic device may display information associated with the highlighted option in display region 510. In some embodiments, the electronic device may be able to detect metadata that is associated with each packet of photographs. As used herein, the term "metadata" can include any kind of data that is associated with files. Metadata can include, but is not limited to, calendar information (for example, date stamp, timestamp, information about a special event or holiday, and other relevant information), location information (for example, location in photograph, location where photograph was taken, location where song was written, location described in a song, and other relevant information), network information (for example, website source and other relevant information), media information (for example, artist information, song duration information, cover art information, and other relevant information), photograph information (for example, object of photographs, photographer, camera information, camera settings information, and other relevant information), keyword information (for example, words that designate ideas with which the file is associated and other relevant information), information that is determined by analysis of the files themselves (such as facial recognition data, object recognition data, and other relevant information), and any other information that can be associated with files. The electronic device can derive this metadata to associate with photograph packets from metadata associated with individual photographs. Alternatively, the electronic device can derive metadata from or apply metadata to the packet as a whole. The metadata can designate, for example, theme elements to be applied to the photographs when the photographs are displayed.

Figure 6:
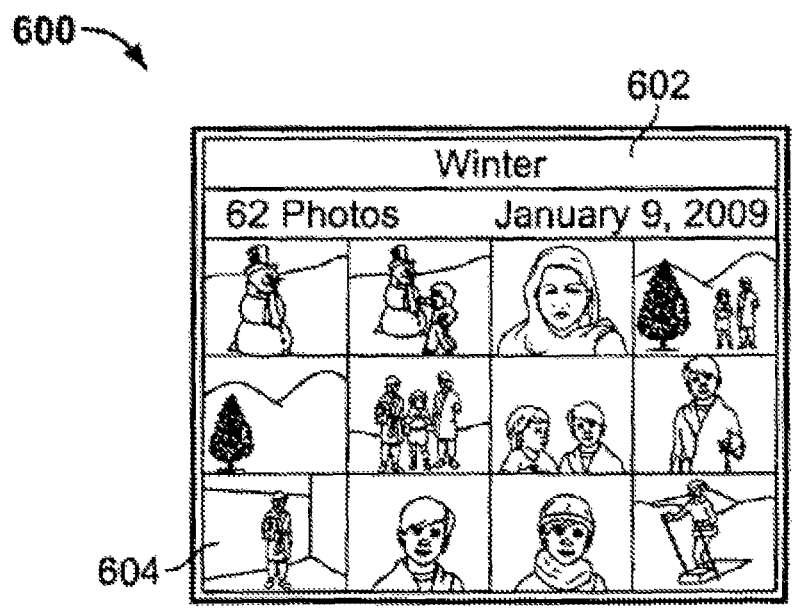
FIG. 6 is a schematic view of an illustrative display of photos in accordance with one embodiment of the invention.

FIG. 6 is a schematic view of an illustrative display of photos in accordance with one embodiment of the invention. The electronic device may provide display 600 in response to receiving a selection of Winter album option 508 (FIG. 5). Display 600 may include one or more regions, such as for example, header region 602 and display region 604. This display can show a number of photographs, specifically photographs associated with the photographic packet named "Winter." FIG. 6 shows the photographs as appearing in a grid, but one skilled in the art would appreciate that the photographs can be displayed in any manner, either one at a time or several at a time. For example, in some embodiments, instead of showing photographs appearing in a grid, the electronic device may display a photograph individually. This individual display may be in response to a user input, in response to programming, or in response to another stimulus. As another example, in some embodiments, the electronic device may show a photographic slideshow using photographs from the Winter photographic packet from this display. The electronic device may initiate the photographic slideshow in response to user interaction, such as, for example, pressing a "play" button, in response to programming, simply selecting the Winter album option 508, or in response to any other appropriate stimulus. The photographs of the Winter album may be selected using any suitable approach, including for example selected by a user or automatically selected by the electronic device (e.g., using metadata).

As used herein, the phrase "photographic slideshow" includes any display of photographs, including but not limited to a display of one photograph individually, a display of several photographs at once, a display of more than one photograph successively, or any other manner in which photographs can be displayed. The term may include any type of visual display of photographs capable of being displayed on an electronic device. For example, in some embodiments of the invention, the electronic device may, in response to user input or other appropriate signals requesting a slideshow of the Winter album, produce a slideshow that displays some or all of the photographs contained in photograph packet Winter. Photographic slideshows can be stored as one or more video data files, as a listing of metadata identifying photographs, video files, audio files and theme elements (e.g., as an XML file), or using any other suitable approach.

In some embodiments, a user may desire to apply theme elements or other display elements to a slide show. As used herein, the phrase "theme element" may refer to any element that can be applied, inter alia, to photographs, photographic slideshows, user interface menus, and other suitable displays. Theme elements can include, for example, graphical elements, (e.g., stationary or moving elements overlaid on photographs), audio elements (e.g., music played during the slideshow or sound effects accompanying photographs or transitions), transition elements (e.g., manners of introducing a new photograph), photograph selection elements (e.g., methods for allowing the user or the system to select the next photograph to be displayed, or the layering of different elements), or any other suitable elements. The grouping of theme elements into a theme can, but may not necessarily, involve theme elements that are conceptually related to one another.

Figure 7:
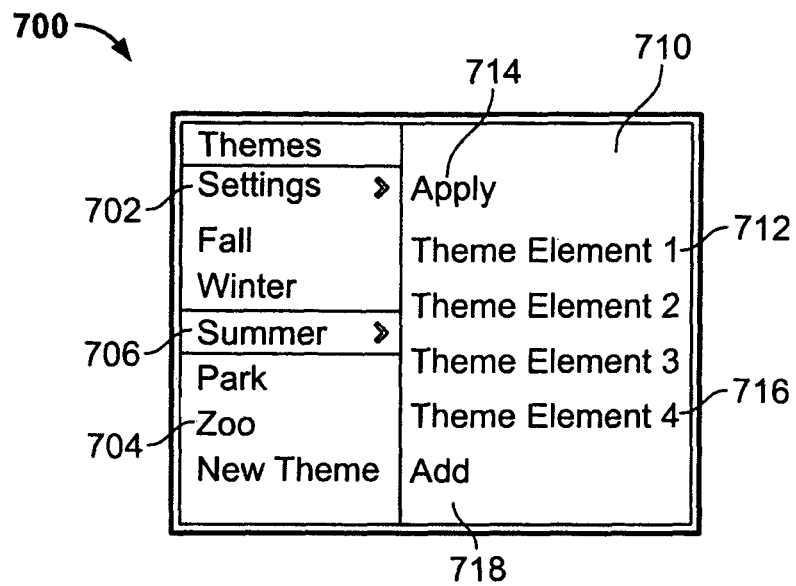
FIG. 7 is a schematic view of an illustrative display screen for selecting theme options in accordance with one embodiment of the invention.

The user may enable or select theme elements using any suitable approach. In some embodiments, the user may toggle or select an appropriate option in a displayed menu. For example, the user may select Settings option 410 (FIG. 4) to access and modify display settings or parameters including theme or theme element options (e.g., to access a Theme option). As used herein, the term "theme" may refer to a grouping of theme elements that can be applied to photographs, photographic slideshows, user interface menus, and other suitable displays. FIG. 7 is a schematic view of an illustrative display screen for selecting theme options in accordance with one embodiment of the invention. Display 700 may include options region 702 that includes a listing of selectable themes. For example, options region 702 may include listing 704 of themes or theme related options (e.g., theme names or new theme options). In response to navigating highlight region 706 over an option or selecting an option, the electronic device may display information related to the highlighted or selected option in display region 710. In some embodiments, the displayed information may include listing 712 of selectable sub-options. For example, listing 712 may include Apply option 714 for applying a selected theme (e.g., selected in options region 702) to the display of photographs or other information. As another example, listing 712 may include Theme Element options 716 for selecting particular theme elements defining the selected theme. In response to selecting a Theme Element option, the user may edit or remove an existing theme element from the selected theme. The user may similarly add additional theme elements to a theme by selection Add option 718.

Figure 8:
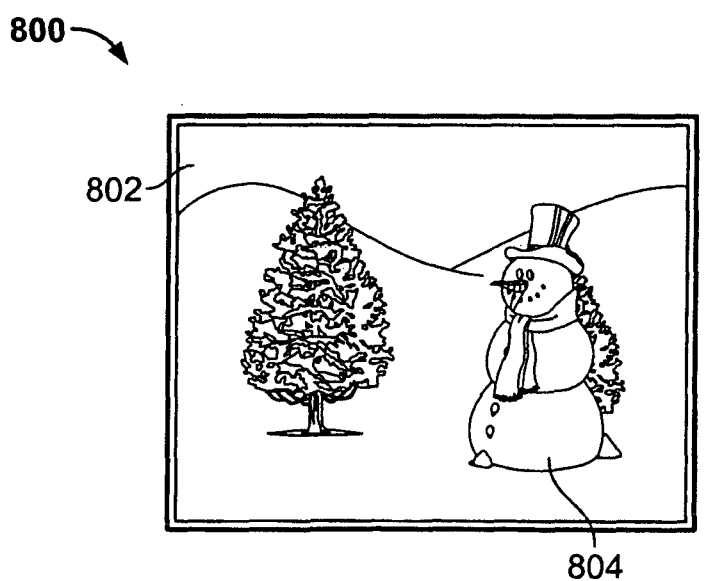
FIG. 8 is an schematic view of an illustrative display of a stationary theme element in accordance with one embodiment of the invention.

Each theme may include any suitable theme element. For example, a theme may include a stationary theme element. FIG. 8 is an schematic view of an illustrative display of a stationary theme element in accordance with one embodiment of the invention. Display 800 may include photograph 802 and theme element 804. Element 804 may include a stationary element overlaid on display 800 (e.g., on or near photograph 802). In some embodiments, several elements 804 may be provided on display 800. In the example of FIG. 8, element 804 can include a representation of a snowman.

Figure 9:
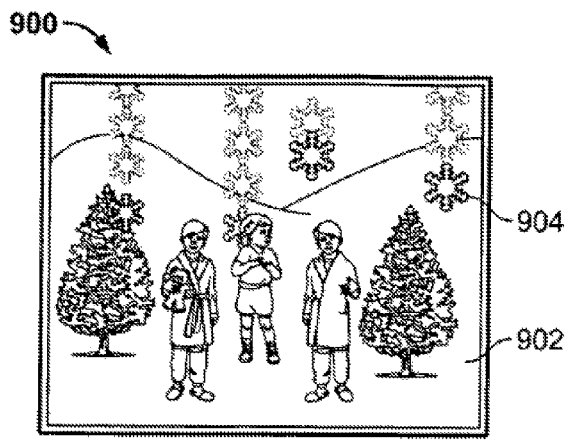
FIG. 9 is a schematic view of an illustrative display of a moving element in accordance with one embodiment of the invention.

As another example, a theme may include a moving theme element. FIG. 9 is a schematic view of an illustrative display of a moving element in accordance with one embodiment of the invention. Display 900 may include photograph 902 occupying some or all of display 900. Theme element 904 may include a moving element overlaid on display 900, for example on or near photograph 902. Element 904 may be operative to move across display 900, for example in a predetermined manner (e.g., related to the type of element displayed) or in a manner defined by the user. In some embodiments, several elements 904 may be displayed on display 900. In the example of FIG. 9, moving element 904 may represent a snowflake moving on the display (for example, in a downward direction).

Figure 10A:
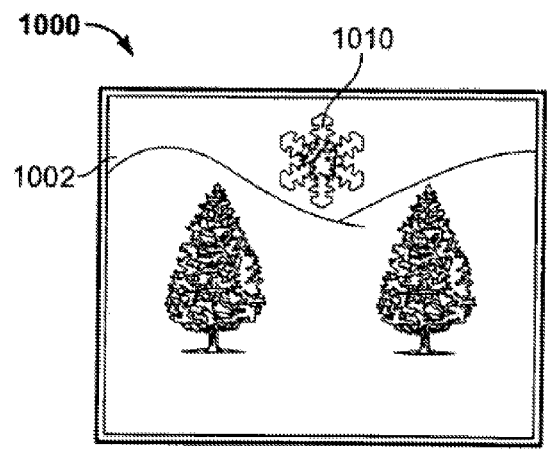
FIGS. 10A-C are a schematic view of successive illustrative displays of a transition element in accordance with one embodiment of the invention.
Figure 10B:
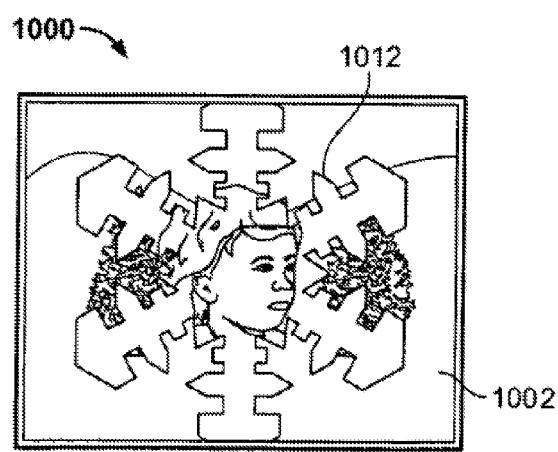
Figure 10C:
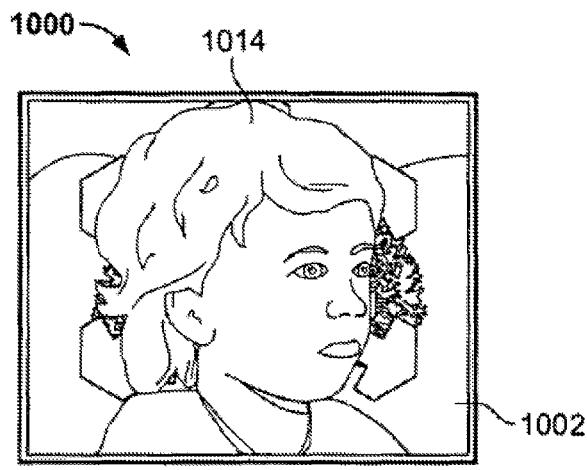

As another example, a theme may include a moving transition element. FIGS. 10A-C are schematic views of successive illustrative displays of a transition element in accordance with one embodiment of the invention. Display 1000 may include photograph 1002. The visible portions of photograph 1002 may be determined by changing transition elements 1010, 1012, and 1014. For example, transition elements 1010, 1012 and 1014 may be the same transition elements that grow during the transition (e.g., an element coming into the foreground or entering the display), showing a larger portion of photograph 1002 until most or all of photograph 1002 is displayed. In the example of FIG. 10, transition elements 1010, 1012 and 1014 may include a snowflake falling into the display. The transition element may be displayed over any suitable background, including for example a blank (e.g., white) background, a background that has one or more photographs, a background with a theme element, or any other suitable background.

Figure 11:
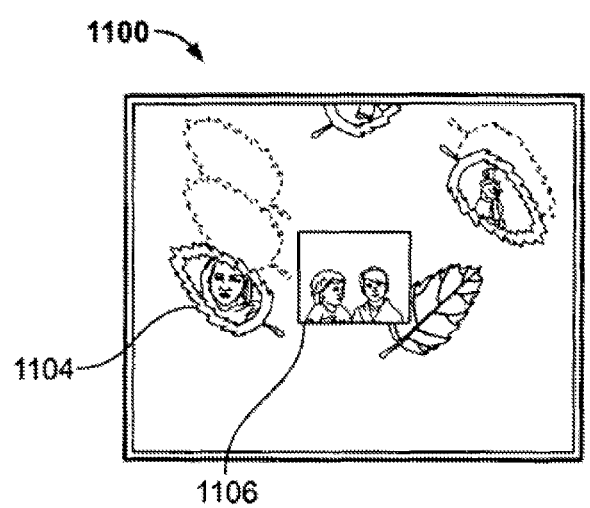
FIG. 11 is a schematic view of a photograph selection element in accordance with one embodiment of the invention.

As another example, a theme may include a photograph selection element. FIG. 11 is a schematic view of a photograph selection element in accordance with one embodiment of the invention. Display 1100 may include one or more transition elements 1104 moving across the display. A photograph may be associated with each transition element 1104, for example displayed within the boundary of transition element 1104 (e.g., portions of each photograph are shown within the transition element) or as a hidden association (e.g., using metadata). As a transition element 1104 moves across display 1100, it may move partially or entirely within selection region 1106. Selection region 1106 may be visually depicted on display 1100 (e.g., as a box or other shape), or may instead be hidden from view. When transition element 1104 moves within selection region 1106, the electronic device may identify and display the photograph associated with transition element 1104 on display 1100 (e.g., within region 1106). In the example of FIG. 11, transition element 1104 may include a leaf in which an image is partially displayed, and which image is entirely displayed within region 1106 when at least a portion of transition element 1104 is within region 1106.

Figure 12:
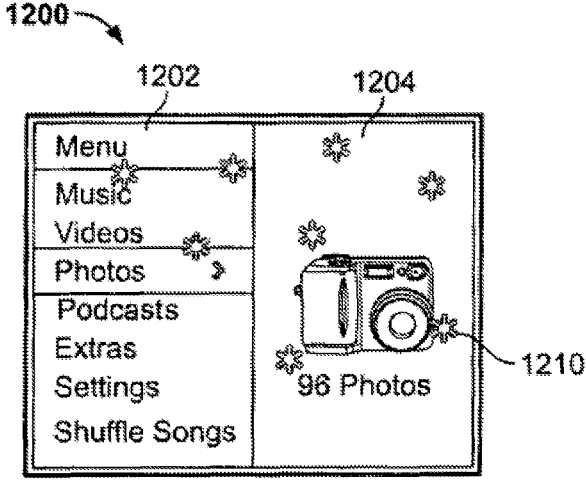
FIG. 12 is a schematic view of an illustrative display screen having theme elements in accordance with one embodiment of the invention.

In some embodiments, the electronic device can apply theme elements to displays other than photographic slideshows. FIG. 12 is a schematic view of an illustrative display screen having theme elements in accordance with one embodiment of the invention. Display 1200 may include options region 1202 and display region 1204. The electronic device may display any suitable theme element 1210 on display 1200, including for example a stationary or moving theme element. As another example, the electronic device may provide transition theme elements for changing menu or option displays (e.g., in response to a user selection of an option from option region 1202, use a transition theme element to display information in information region 1210).

Several related theme elements may be combined to form themes. For example, a Birthday theme may include theme elements associated with or related to birthdays. Such theme elements may include, for example, stationary graphical elements such as a birthday cake and birthday hats, moving graphical elements such as confetti, audio elements such as a birthday-themed song and sounds of celebratory noisemakers, transition elements such as photographs entering the display in the shape of gifts, and photograph selection elements such as the ability to select a photograph shaped like a candle (e.g., as a secondary transition element) when it enters a certain part of the display. Any other suitable theme with related theme elements may be used (e.g., a Fall theme using leaves in theme elements, or a Winter theme using snow flakes, snowmen and winter sports images in theme elements).

The electronic device may obtain themes and theme elements using any suitable approach. For example, one or more default themes (which may be modified by a user) may be provided with the electronic device. As another example, a user may access themes from remote sources (e.g., a remote source such as the Internet or a host device such as a computer) to add or download to the electronic device. As still another example, a user may define one or more themes by selecting particular theme elements. As yet still another example, the electronic device may dynamically create a theme based on metadata associated with theme elements and with photographs to display.

The electronic device may define or apply a theme and its associated theme elements to a photograph display (e.g., a photographic slideshow) or to any other electronic device display using any suitable approach. In some embodiments, the electronic device may apply a theme to a display in response to receiving a user instruction. For example, a user may select a theme and an instruction to apply the theme (e.g., Apply option 714, FIG. 7). In response to receiving the instruction from the user, the electronic device may apply the theme elements associated with the theme to various displays of the electronic device.

In some embodiments, the electronic device may instead or in addition automatically apply a theme to a display. For example, a particular photographic packet or album may include metadata associating a theme or theme element with the packet or album (e.g., a user or automatically generated metadata tag). The electronic device may automatically add the theme or theme elements identified by the metadata when photographs of the packet or album are displayed (e.g., in response to a user selection of the packet or album, or in response to automatically displaying the photographs of the packet or album, for example in a screen saver). If the electronic device adds individual theme elements to a display instead of a complete theme, the electronic device may in turn define a new theme that includes the added theme elements.

Any suitable metadata may be used to identify a theme or theme elements to apply to a photograph display, or to define a new theme to apply to a photograph display. For example, the electronic device may use geographic metadata associated with a theme, theme element, or photograph to add theme elements to a display. The geographic metadata may include, for example, the current location of the electronic device or location information associated with a photograph or theme element (e.g., where a photograph was taken, or what a photograph relates to). For example, a photograph of a New York Yankees baseball game may be associated with a New York city geographic location (even if the game is played elsewhere). The electronic device may then identify theme elements also associated with the determined location (e.g., a Statue of Liberty element or a New York subway transition element associated with New York city) to apply to the display of the photograph.

As another example, the electronic device may use time or calendar information associated with a theme, theme element, or photograph to add theme elements to a display. The time or calendar information may include, for example, the time or time zone of a photograph, an event associated with a photograph (e.g., a photograph taken during the time of an event in the user's calendar may be associated with information related to the event), or any other suitable information. For example, if a photograph is taken during a calendar event entitled "Bob's birthday," the electronic device may associate metadata for birthdays and parties with the photograph, and identify themes or theme events also associated with birthdays or parties (e.g., a birthday song, or cake, candle and present theme elements).

As still another example, the electronic device may use preference information associated with a particular user to add theme elements to photographs taken by, of or otherwise related to the particular user. For example, if the electronic device determines that the user likes a particular song, or has a specific interest, the electronic device may apply theme elements related to the determined song or interest to photographs taken by, of, viewed by, or otherwise related to the user.

In some embodiments, the electronic device may provide a photographic slideshow display based on a selected theme or one or more selected photographs. For example, the electronic device may use contextual information associated with a particular selected photograph to identify other related photographs and a related theme or related theme elements to create a photographic slideshow that includes related components. As another example, the electronic device may use contextual information associated with a particular theme or theme element to identify one or more photographs to create a photographic slideshow that includes related components. As still another example, the electronic device may receive a selection of particular contextual information (e.g., one or more instances of contextual information, such as a location and a time), and select photographs and theme elements to apply to the photographs to provide a display that is related to the selected contextual information.

Contextual information may include any information related to a photograph, theme or theme element that the electronic device may use, including for example location, time and date, calendar events, holidays or other events (e.g., current or upcoming holidays and events relative to the date of a photograph), user preference information (e.g., favorite media or tastes), history information (e.g., previously accessed photographs), user purchase information (e.g., purchased media), communications information (e.g., frequent contacts and information related to frequent contacts), metadata, or any other suitable information that can provide context to photographs, themes and theme elements available to a user, or to a user's tastes (e.g., so that the user enjoys the application of the theme to the display).

The electronic device may perform any suitable action with a generated photographic slideshow. For example, the electronic device may be operative to export a photographic slideshow with its theme elements. The electronic device may provide an exported slideshow to other devices using any suitable format, including for example as a video file, as a presentation, as a folder or series of files that include the photographs, theme elements, and control file (e.g., an XML file) indicating the manner in which the photographs and theme elements interact, or in any other suitable format.

Figure 13:
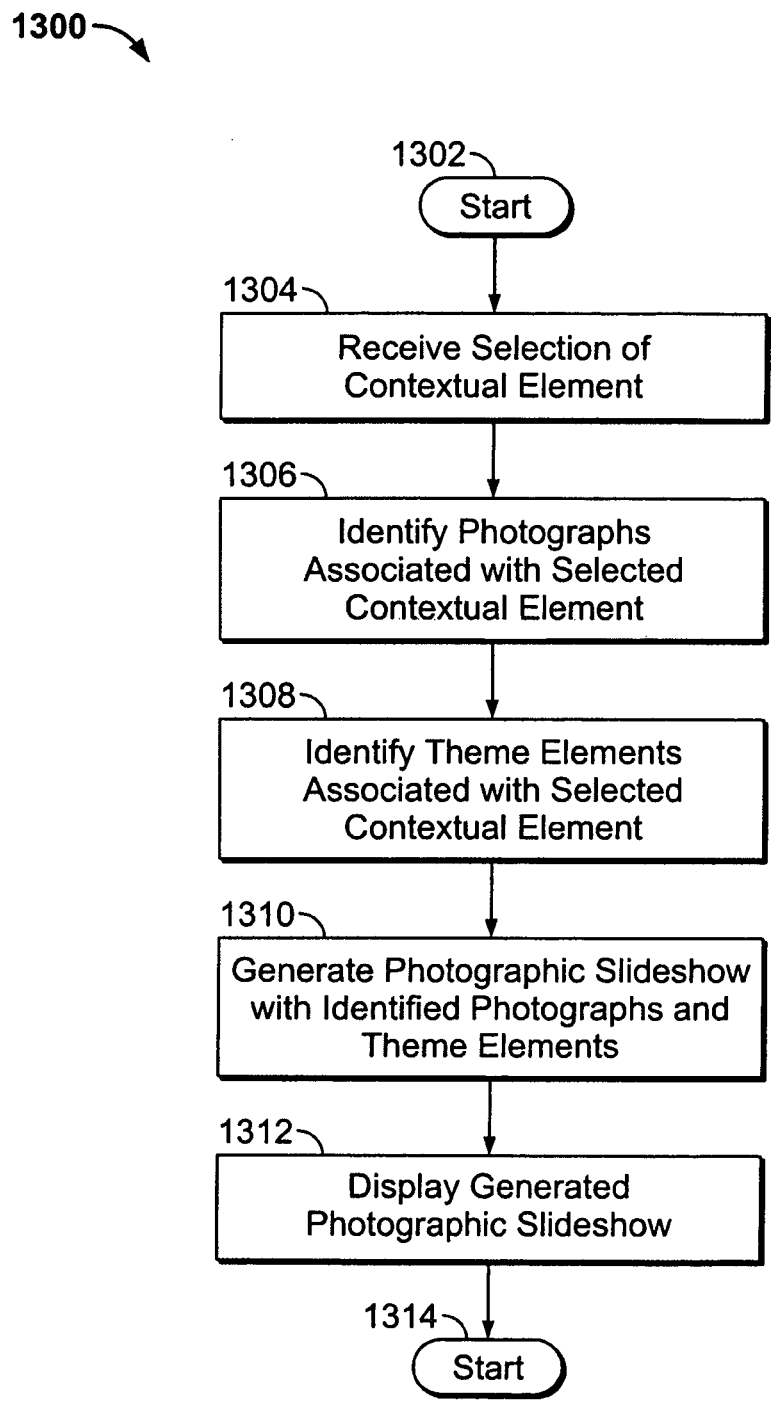
FIG. 13 is a flowchart of an illustrative process for creating a photographic slideshow having theme elements in accordance with one embodiment of the invention.

FIG. 13 is a flowchart of an illustrative process for creating a photographic slideshow having theme elements in accordance with one embodiment of the invention. Process 1300 may begin at step 1302. At step 1304, the electronic device may receive a selection of contextual information. For example, the electronic device may receive a user selection of particular contextual information. As another example, the electronic device may automatically select contextual information based on any suitable criteria (e.g., user history or preference information). In some embodiments, the electronic device may instead or in addition receive a selection of a theme or theme element, or a photograph. In such embodiments, the electronic device may extract or identify contextual information associated with the selected theme, theme element or photograph.

At step 1306, the electronic device may identify photographs associated with the selected contextual information. For example, the electronic device may identify photographs in a user's library or available from a device remote to the user that include the selected contextual information. The electronic device may identify such photographs using any suitable approach, including for example based on metadata associated with individual or packets of photographs.

At step 1308, the electronic device may identify theme elements associated with the selected contextual information. For example, the electronic device may identify theme elements stored by the device or available from a remote resource (e.g., the Internet) or host device that may be coupled to the electronic device. The electronic device may identify such theme elements using any suitable approach, including for example based on metadata associated with different theme elements. In some embodiments, the electronic device may instead or in addition identify themes (e.g., groupings of theme elements) associated with the selected contextual information.

At step 1310, the electronic device may generate a photographic slideshow using the identified photographs and theme elements. For example, the electronic device may define the order in which the identified photographs are to be displayed, the transition theme elements to be applied between two displayed photographs, and the other theme elements to be displayed or overlaid on the photographs. At step 1312, the electronic device may display the generated photographic slide show. Process 1300 may then end at step 1314.

In some embodiments, prior to ending a step 1314, the electronic device may export the generated slideshow. The electronic device may provide an exported slideshow to other devices using any suitable format, including for example as a video file, as a presentation, as a folder or series of files that include the photographs, theme elements, and control file (e.g., an XML file) indicating the manner in which the photographs and theme elements interact, or in any other suitable format.

The above disclosure is meant to be exemplary and not limiting. Only the claims that follow are meant to set bounds as to what the present invention includes.

What is claimed is:

1. A method for displaying photographs in a photographic slideshow, comprising:
   receiving with an electronic device contextual information;
   after the receiving:
   identifying with the electronic device at least one photograph that is associated with the received contextual information; and
   selecting with the electronic device at least one theme element that is associated with the received contextual information,
   after the identifying and after the selecting, generating with the electronic device the photographic slideshow, wherein the generated photographic slideshow comprises a first slideshow portion, and wherein the first slideshow portion comprises at least a portion of a first photograph, at least a portion of the identified at least one photograph, and the selected at least one theme element; and
   after the generating, displaying with the electronic device the first slideshow portion of the generated photographic slideshow by displaying each of the at least a portion of the first photograph, the at least a portion of the identified at least one photograph, and the selected at least one theme element, wherein during the displaying the first slideshow portion:
   the displayed at least a portion of the identified at least one photograph is within a boundary of the displayed at least one theme element;
   each of the displayed at least a portion of the identified at least one photograph and the displayed at least one theme element is at least partially overlaid on the displayed at least a portion of the first photograph; and
   each of the displayed at least a portion of the identified at least one photograph and the displayed at least one theme element moves relative to the displayed at least a portion of the first photograph.

2. The method of claim 1, wherein the receiving comprises receiving a user selection of the contextual information.

3. The method of claim 1, wherein the receiving comprises automatically selecting with the electronic device the contextual information.

4. The method of claim 1, wherein the receiving comprises:
   receiving a user selection of a particular photograph; and
   extracting particular contextual information that is associated with the selected particular photograph.

5. The method of claim 1, wherein the receiving comprises:
   receiving a user selection of a plurality of photographs; and
   extracting particular contextual information that is associated with each photograph of the selected plurality of photographs.

6. The method of claim 1, wherein the receiving further comprises:
   receiving a user selection of a particular theme element; and
   extracting particular contextual information that is associated with the selected particular theme element.

7. The method of claim 1, wherein the contextual information comprises at least one of:
   a location;
   a time;

a date;
a calendar event;
user preference information; and
user history information.

8. The method of claim 7, wherein the contextual information that is associated with each of the identified at least one photograph and the selected at least one theme element is stored as metadata that is associated with each of the identified at least one photograph and the selected at least one theme element.

9. A method for providing a photographic slideshow, comprising:
receiving with an electronic device a user selection of a photograph;
in response to the receiving, identifying with the electronic device at least one element of contextual information that is associated with the selected photograph;
in response to the identifying, retrieving with the electronic device at least one theme element that is associated with the identified at least one element of contextual information,
after the retrieving, associating the selected photograph and the retrieved at least one theme element;
after the associating, generating the photographic slideshow, wherein the generated photographic slideshow comprises a selection region, at least a portion of the selected photograph, and the retrieved at least one theme element; and
after the generating, displaying the generated photographic slideshow by displaying each of the selection region and the retrieved at least one theme element, wherein during the displaying the generated photographic slideshow:
the displayed at least one theme element moves relative to the displayed selection region; and
when a portion of the displayed at least one theme element moves within the displayed selection region, the at least a portion of the selected photograph that is associated with the displayed at least one theme element is displayed within the displayed selection region.

10. The method of claim 9, wherein the retrieving further comprises retrieving a theme that is associated with the identified at least one element of contextual information, wherein the retrieved theme comprises a plurality of theme elements.

11. The method of claim 10, wherein the plurality of theme elements shares the identified at least one element of contextual information.

12. The method of claim 9, wherein the identified at least one element of contextual information comprises at least one of:
a location;
a time;
a date;
a calendar event;
a holiday;
user preference information;
history information;
user purchase information; and
communications information.

13. A non-transitory computer-readable media operative to display photographs in a slideshow, the computer readable media comprising computer program logic recorded thereon for:
receiving with an electronic device contextual information;
after the receiving:
identifying with the electronic device at least one photograph that is associated with the received contextual information; and
selecting with the electronic device at least one theme element that is associated with the received contextual information
after the identifying and after the selecting, generating with the electronic device the slideshow, wherein the generated slideshow comprises a first slideshow portion, and wherein the first slideshow portion comprises at least a portion of a first photograph, at least a portion of the identified at least one photograph, and the selected at least one theme element; and
after the generating, displaying with the electronic device the first slideshow portion of the generated photographic slideshow by displaying each of the at least a portion of the first photograph, the at least a portion of the identified at least one photograph, and the selected at least one theme element, wherein during the displaying the first slideshow portion:
the displayed at least a portion of the identified at least one photograph is within a boundary of the displayed at least one theme element;
each of the displayed at least a portion of the identified at least one photograph and the displayed at least one theme element is at least partially overlaid on the displayed at least a portion of the first photograph; and
each of the displayed at least a portion of the identified at least one photograph and the displayed at least one theme element moves relative to the displayed at least a portion of the first photograph.

14. The method of claim 1, wherein the first slideshow portion comprises one successive portion of a plurality of successive portions of the generated photographic slideshow.

15. The method of claim 9, wherein the displaying the generated photographic slideshow further comprises displaying the at least a portion of the selected photograph within a boundary of the displayed at least one theme element.

16. The method of claim 9, wherein, when no portion of the displayed at least one theme element is moved within the displayed selection region, the at least a portion of the selected photograph that is associated with the displayed at least one theme element is not displayed within the displayed selection region.

17. A method comprising:
receiving with an electronic device a selection of a first item;
after the receiving:
identifying with the electronic device at least one photograph that is associated with the selected first item; and
selecting with the electronic device at least one theme element that is associated with the selected first item;
after the identifying and after the selecting, generating with the electronic device a photographic slideshow, wherein the generated photographic slideshow comprises a first slideshow portion, and wherein the first slideshow portion comprises at least a portion of a first photograph, at least a portion of the identified at least one photograph, and the selected at least one theme element; and
after the generating, displaying with the electronic device the first slideshow portion of the generated photographic slideshow by displaying each of the at least a portion of the first photograph, the at least a portion of the identified at least one photograph, and the selected at least one theme element, wherein during the displaying the first slideshow portion:
the displayed at least a portion of the identified at least one photograph is within a boundary of the displayed at least one theme element;

each of the displayed at least a portion of the identified at least one photograph and the displayed at least one theme element is at least partially overlaid on the displayed at least a portion of the first photograph; and each of the displayed at least a portion of the identified at least one photograph and the displayed at least one theme element moves relative to the displayed at least a portion of the first photograph.

18. The method of claim 17, wherein the selected first item comprises at least one of contextual information, a particular photograph, a particular theme, and a particular theme element.

\* \* \* \* \*